No. 622,197. Patented Apr. 4, 1899.
A. G. BAYLES, L. D. DE SAUSSURE & T. HERRON.
PIPE WRENCH.
(Application filed May 6, 1898.)
(No Model.)

WITNESSES:
M. A. Heall.
F. van Gerpen.

Alfred G. Bayles,
Louis D. deSaussure
Thomas Herron.
INVENTORS.

BY
Garry P. Van Wye.
ATTORNEY.

THE NORRIS PETERS CO., PHOTO-LITHO., WASHINGTON, D. C.

United States Patent Office.

ALFRED G. BAYLES, LOUIS D. DE SAUSSURE, AND THOMAS HERRON, OF NEW YORK, N. Y.

PIPE-WRENCH.

SPECIFICATION forming part of Letters Patent No. 622,197, dated April 4, 1899.

Application filed May 6, 1898. Serial No. 679,938. (No model.)

*To all whom it may concern:*

Be it known that we, ALFRED G. BAYLES, residing at New York, in the county of New York, and LOUIS D. DE SAUSSURE and THOMAS HERRON, residing at New York, (Brooklyn,) in the county of Kings, State of New York, citizens of the United States, have invented a new and useful Pipe-Wrench, of which the following is a specification.

This invention relates to pipe-wrenches, and especially to that class in which a removable jaw-plate is used for the purpose of providing teeth that are tempered while the body of the pliers remains untempered; and the object of our invention is to provide a removable jaw-plate that can be easily secured in position at the least possible cost and which will be held firmly when secured in place. We attain these objects by the mechanism illustrated in the accompanying drawings, in which—

Figure 1:
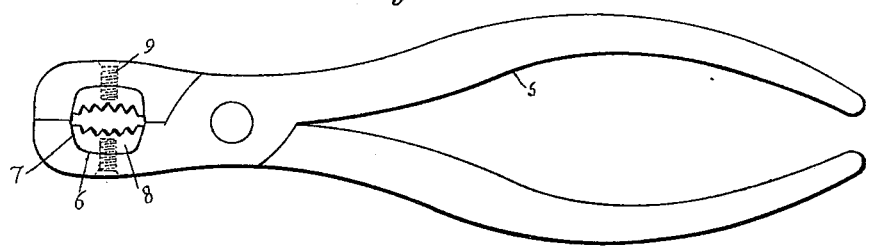
Figure 2:
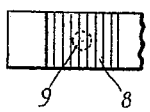

Figure 1 is a side view of a pipe-wrench, showing our improvement applied thereto; and Fig. 2 is a plan view of the inner surface of one of the jaws.

Similar numerals of reference refer to the same parts in each of the views, and in the practice of our invention we provide a pipe-wrench 5, which is of the kind commonly known as "gas-burner pliers," and on the inner surface of each of the jaws we cut a recess 6, which extends transversely of the jaw, and the ends thereof are made flaring, as clearly shown at 7. We also provide a plate 8, the ends of which are beveled to correspond with the flaring ends of the recesses 6, and one side thereof is provided with serrations or teeth. The plate 8 is made of tempered metal, while the remaining portion of the wrench is preferably made of untempered metal. A screw 9 passes through the jaw from the rear and engages the plate 8, as shown in dotted lines in Fig. 1, and holds the said plate securely in position.

The plates 8 are made large enough so that when drawn into the recesses 7 the beveled ends will bind tightly against the flaring ends of the recess, the same as a wedge, and, if desired, the plate 8 may be made large enough so that the edges of the recess will engage the beveled ends of the plates before the inner surface meets the inner wall of the recess, and by turning the screw 9 the plate 8 will be drawn closer to the bottom, thereby more firmly wedging the plate in position. In practice, however, we prefer to make the plate 8 of such a size that the ends thereof will commence to bind just before it reaches the bottom, so that the same may be drawn to the bottom by the screw 9.

The advantage of this construction will be clearly seen from the fact that the recesses 6 can be cut in a milling-machine, a large quantity being cut at one time, while the plates 8 can be drop-forged and need not be "machined" at all, with the exception of boring and tapping, care being taken that they be not made too small to bind at the ends.

It will thus be seen that we accomplish the object of our invention in a very simple and efficient manner, and it is also evident that many changes can be made without departing from the spirit of our invention, all of which changes we reserve the right to make.

Having thus described our invention, what we claim as new, and desire to secure by Letters Patent, is—

A pipe-wrench provided with removable plates forming the inner surface of the jaws; said plates being oblong in form, and provided with beveled ends; the inner surface of the jaws being cut away to form a recess having flaring ends; the length of said plates being slightly greater than the length of said recesses; and a screw passing through said jaws from the rear and engaging said plates, substantially as and for the purpose described.

In testimony that we claim the above we have hereto affixed our signatures in the presence of two subscribing witnesses.

ALFRED G. BAYLES.
LOUIS D. DE SAUSSURE.
THOMAS HERRON.

Witnesses:
M. A. HALL,
F. VAN GERPEN.